D. S. JACOBUS.
WATER TUBE BOILER.
APPLICATION FILED MAR. 10, 1914.

1,117,391.

Patented Nov. 17, 1914.
5 SHEETS—SHEET 1.

WITNESSES:
Charles Kelly
P. McKeegan

INVENTOR
David S. Jacobus
BY Gifford & Bull
his ATTORNEYS.

D. S. JACOBUS.
WATER TUBE BOILER.
APPLICATION FILED MAR. 10, 1914.

1,117,391.

Patented Nov. 17, 1914.
5 SHEETS—SHEET 2.

WITNESSES:
Charles Kelly
P. McKeegan

INVENTOR
David S. Jacobus
BY
ATTORNEY

D. S. JACOBUS.
WATER TUBE BOILER.
APPLICATION FILED MAR. 10, 1914.

1,117,391.

Patented Nov. 17, 1914.
5 SHEETS—SHEET 5.

WITNESSES:
Charles Kelly
P. McKrigan

INVENTOR
David S. Jacobus
BY
Gifford K. Bull
his ATTORNEY

UNITED STATES PATENT OFFICE.

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY.

WATER-TUBE BOILER.

1,117,391.  Specification of Letters Patent.  Patented Nov. 17, 1914.

Application filed March 10, 1914. Serial No. 823,649.

*To all whom it may concern:*

Be it known that I, DAVID S. JACOBUS, a citizen of the United States, residing at Jersey City, in the county of Hudson and State of New Jersey, have invented certain new and useful Improvements in Water-Tube Boilers, of which the following is a specification.

My invention relates to water tube boilers and has for its object an increase in the efficiency and capacity in installations of large units. This is effected through a furnace arrangement in which exceptionally high efficiencies are obtained combined with a boiler for economically removing the heat generated in burning the fuel. In certain somewhat similar boilers which have been constructed, where there are three upper steam and water drums and two lower mud drums, there is a limitation to the amount of heating surface which may be installed especially in designs contemplating the use of straight boiler tubes. The present invention overcomes this difficulty and allows for the introduction of any amount of surface that could be desired to meet practical demands. The construction further admits of the introduction of dust pockets for collecting the dust at points where it will not interfere with the passage of the gases through the boiler, which in itself, is a material advantage.

An essential feature in the present construction is the employment of mud drums at the lower ends of the inner banks of tubes in combination with headers into which the lower ends of tubes of the outer bank are expanded, said headers being connected to the mud drums by means of nipples. This arrangement allows either straight or curved tubes to be used and permits any desired amount of generating surface within the range of reasonable practice to be installed per foot of width of the boiler.

The invention will be understood by reference to the accompanying drawings in which—

Figure 1:
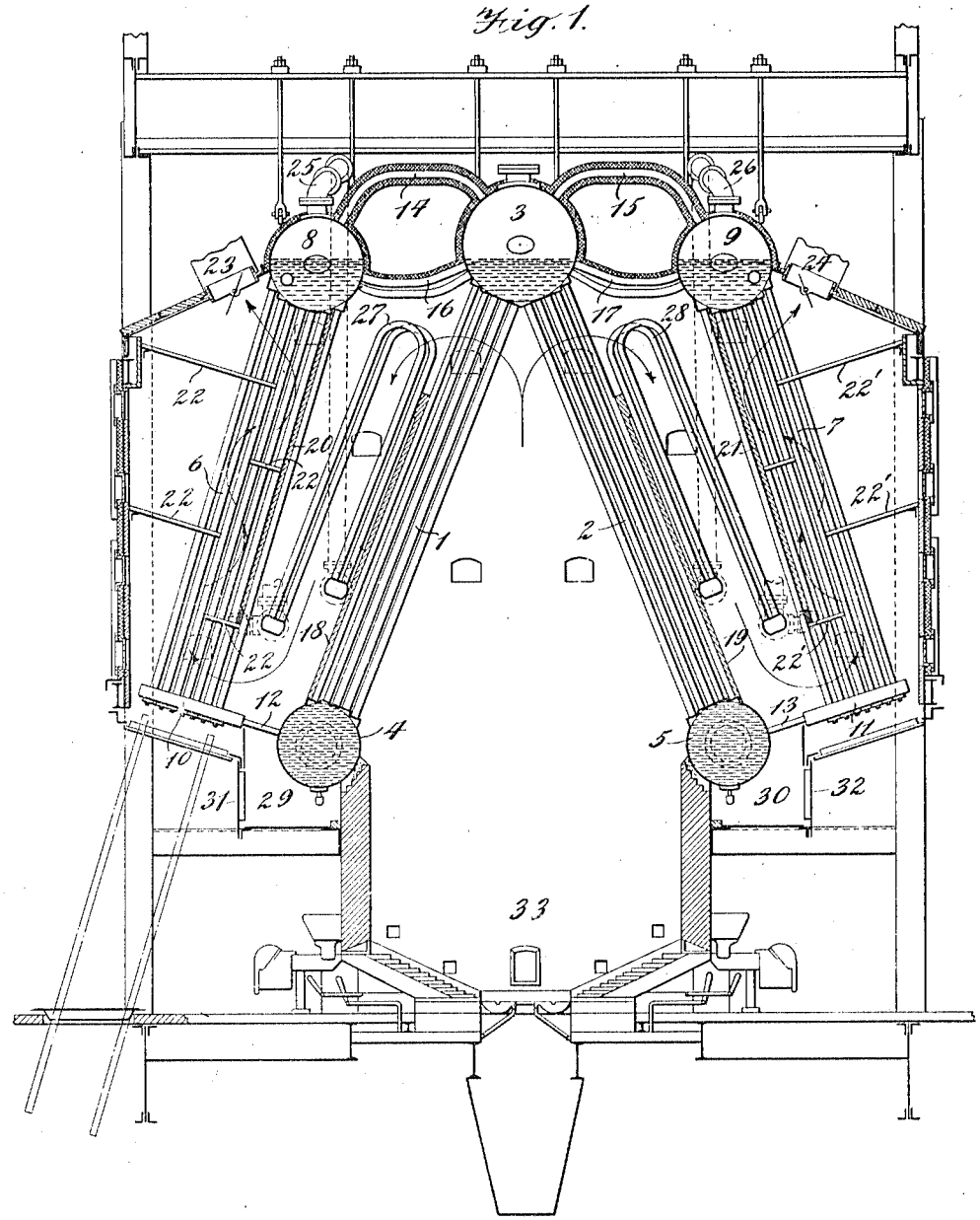

Figure 1 is a longitudinal section of a boiler showing one embodiment of the invention; and Figs. 2, 3, 4 and 5 similar views showing modifications in the form and arrangement of the tubes and other parts.

Similar reference numerals indicate similar parts in the several views.

The design of Fig. 1 shows two inner banks of water tubes 1 and 2 inclined toward each other and expanded at their upper ends into a central steam and water drum 3, and at their lower ends into mud drums 4 and 5, said latter drums extending parallel with drum 3 and from one side wall of the setting to the other side wall, one on each side of the furnace. Inclined to the vertical at substantially the same degree as the inner banks of tubes, are two outer banks 6 and 7, the tubes of which are expanded at their upper ends into outer transverse steam and water drums 8 and 9 placed one on each side of the central steam and water drum and parallel therewith, and their lower ends expanded into headers 10 and 11. These headers are connected by nipples 12 and 13 to mud drums 4 and 5 respectively, spaces between the nipples permitting the dust to fall through into pockets as later described. The central steam and water drum is interconnected with the outer steam and water drums by steam circulators 14 and 15, and by water circulators 16 and 17. A covering of fire brick prevents the gases passing above the water circulators.

Baffles 18 and 19 are placed at the rear of the inner banks of tubes and extend upward from the mud drums so as to direct the hot gases from the furnace to the upper part of the two banks, except where it is desired to secure a higher furnace temperature than would be secured by exposing all of the tubes of the inner banks to the fire, in which case the baffles 18 and 19 are placed between two rows of the tubes so as to expose only a portion of the tubes of each of the inner banks to the fire. The gases then flow downward and are guided to the lower part of the outer banks by baffles 20 and 21, resting on the front row of tubes of said banks, and extending downward from the steam and water drums 8 and 9. After entering the lower part of the outer banks of tubes the gases are made to cross and recross the same by cross baffles 22, as indicated by the arrows, and finally pass to the stack connections through the damper openings 23 and 24. In this design the water and steam circulates upward through the tubes of the inner banks and the water from drum 3 flows into drums 8 and 9 through the circulators 16 and 17, thence downward through the tubes of the outer banks 6 and 7, and through the headers 10 and 11 and connecting nipples 12 and 13 into mud drums 4 and 5, from whence it again flows upward through the tubes of the inner banks. The steam generated by the boiler passes from the drums 8 and 9 through the pipes 25 and 26 to two superheaters 27 and 28, placed in the spaces between the two banks of generating tubes, the steam being thus divided between the two superheaters and finally discharged therefrom into the mains. The superheaters 27 and 28 may be of any approved design, that shown consisting of U-shaped tubes extending substantially parallel with the tubes of the inner banks with their ends expanded into cross boxes. The superheaters may be omitted if saturated steam only is required. Dust pockets 29 and 30 are provided below the mud drums 4 and 5 into which dust or soot will collect after passing through the spaces between the nipples 12 and 13, and from which it may be readily withdrawn through doors 31 and 32, or it may be removed by means of a conveyer.

Figure 2:
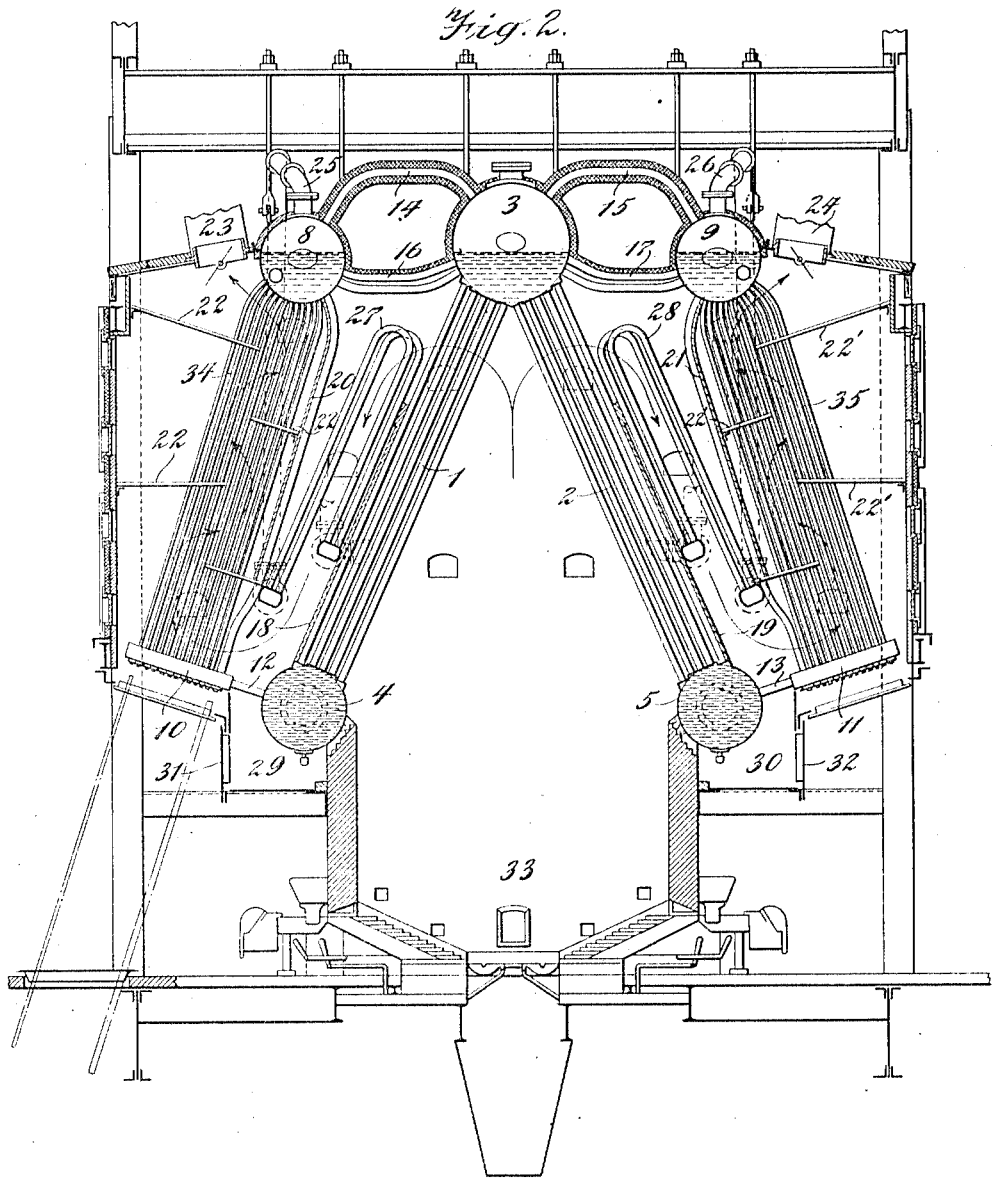

In the design shown in Fig. 2 the tubes of the outer banks 34 and 35 are curved at their upper ends so as to enter the drums 8 and 9 radially, the tubes of the inner banks are of slightly less length than those of Fig. 1; and the tubes of the first row of the outer banks are, for the greater part of their length, set out a short distance from the other tubes of the bank. Also a larger number of tubes are shown in the outer banks than are shown in Fig. 1, and smaller tubes are shown in the outer banks than in the inner banks. Otherwise the construction is substantially the same as shown in Fig. 1.

Figure 3:
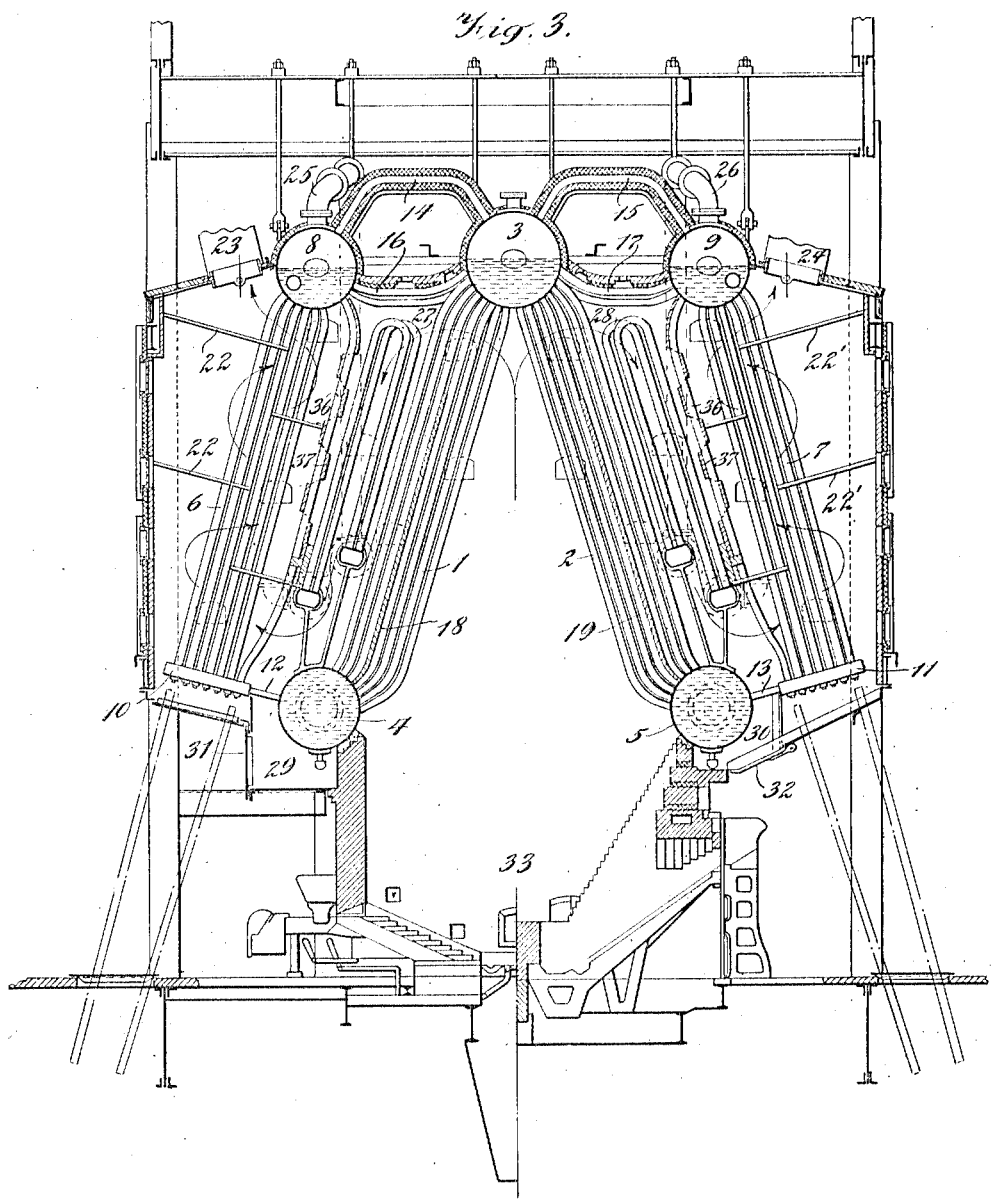

In the design shown in Fig. 3 the tubes of the outer banks are curved at their upper ends as in Fig. 2, and the tubes of the inner banks are curved at both ends so as to enter the central steam and water drum 3 and the mud drums 4 and 5 radially. I also introduce an additional row of tubes 36 set out from the main body of tubes of the outer banks, and upon said rows the baffles 37 are supported. As shown in Fig. 3 the sections of said baffles may be built alternately on opposite sides of the tubes 36. In this design I have shown a Roney stoker on the right hand side of the furnace instead of a Taylor stoker, as on the left hand side and as in all the other designs.

Figure 4:
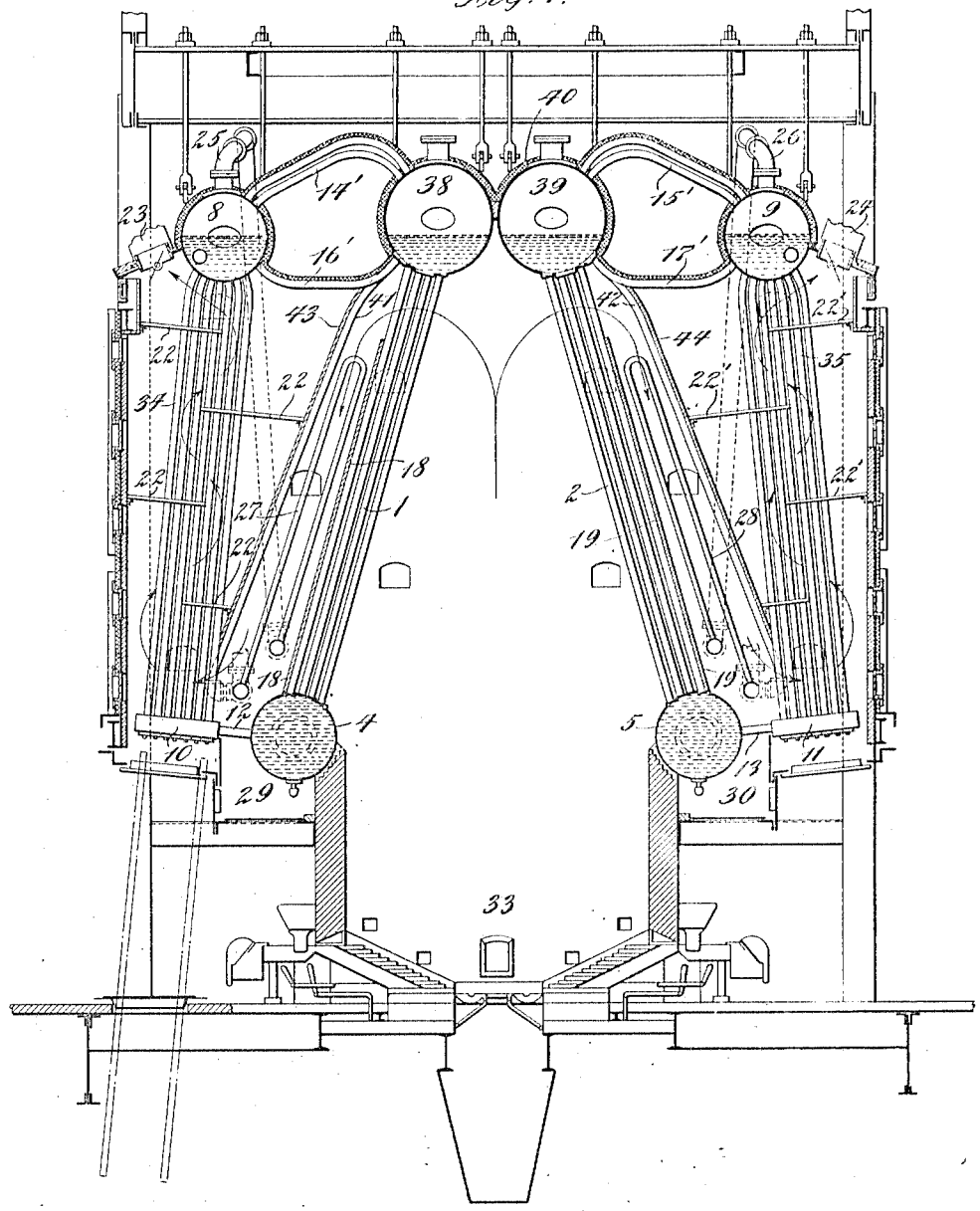

In place of the central steam and water drum 3 of Figs. 1, 2 and 3 I have provided, in the design shown in Fig. 4, two steam and water drums 38 and 39, the tubes of the bank 1 being expanded into drum 38, and the tubes of bank 2 into drum 39, the A-shaped combustion chamber being closed by a fire brick covering 40 over said drums. I have also modified the designs of the previously described boilers by introducing rows of tubes 41 and 42, the former expanded into drum 38 and their lower ends into the headers 10 alternately with the tubes of the first row of the outer bank, and the latter expanded into drum 39 and the headers 11. On these rows of tubes baffles 43 and 44 are supported. The superheaters in this design are located in the spaces between the banks 1 and 2 and the rows of tubes 41 and 42.

Figure 5:
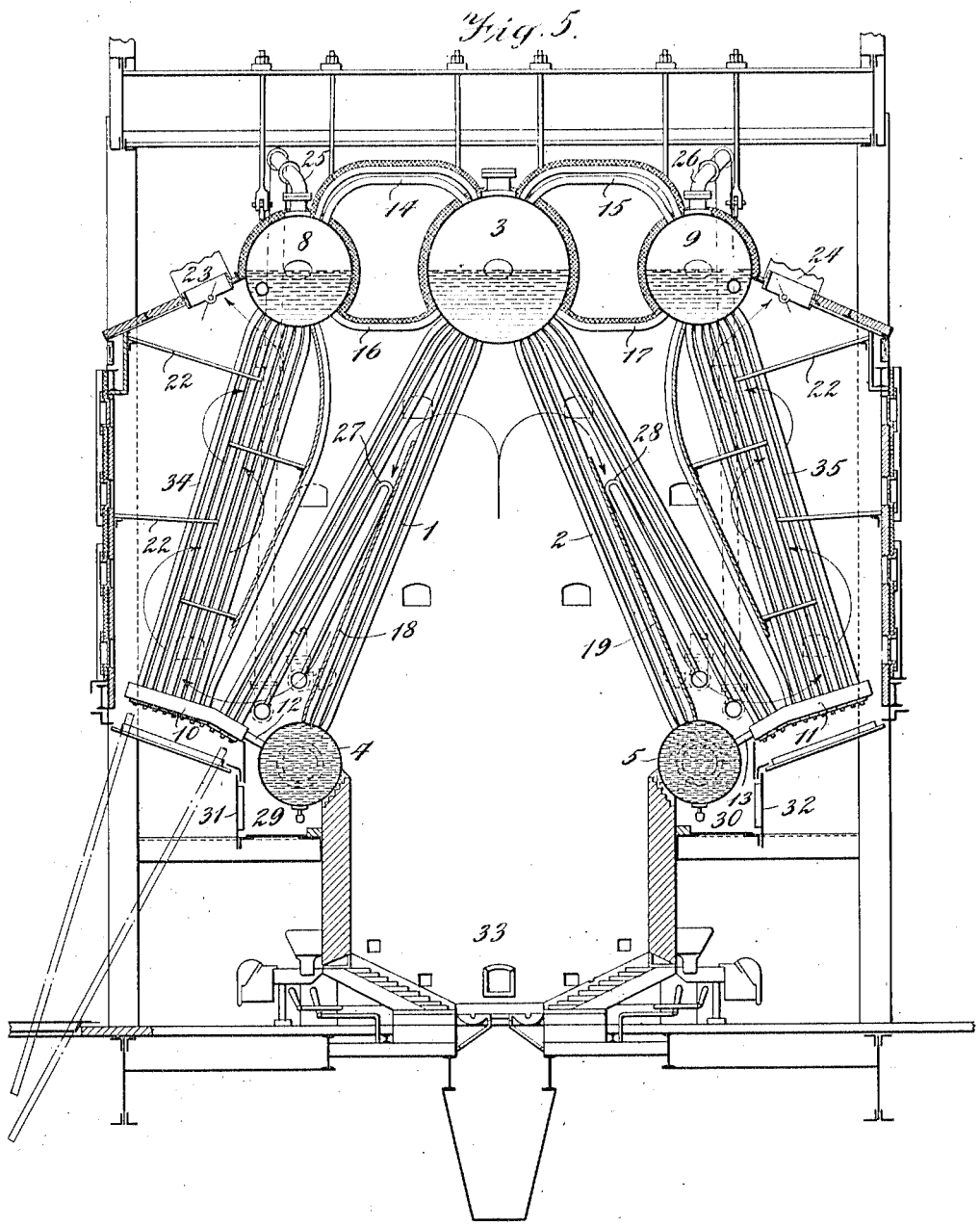

In the design shown in Fig. 5 the tubes of the inner banks, which are expanded into the middle steam and water drum, are divided so as to connect one part with the mud drums 4 and 5 and one part with the headers 10 and 11. The superheaters 27 and 28 are introduced into the spaces between the divided parts of the inner banks of tubes.

The tubes in the outer banks of all of the above described designs may be readily removed, as indicated by the broken lines, by passing them downward through hand hole openings in the headers and new tubes may be inserted by passing them upward through the headers. An advantage derived in the construction of the tube sheet, where straight tubes are inserted in the outer banks, as in Fig. 1, is, that it is not necessary to allow for the removal of the tubes by leaving enough space between the tubes for passing them in and out.

In the ordinary use of straight tubes connected at both ends to drums, it is necessary to allow for removal and replacement of any one of the tubes without removing the others, and to do this sufficient space is left between the tubes, and the spacing and the form of the projections on the drums are so arranged that after cutting out an old tube a new one can be inserted in its place. In inserting the new tube one end of it is passed through the opening in one of the drums and it is then moved over the opening in the other drum and made to enter the latter after which it is expanded into place. To accomplish this requires a much wider spacing of the tubes than is required in boilers of the present design where the tubes are replaced in the outer banks by passing them upward through the hand hole openings in the headers. The hand hole fittings provided for the removal and replacement of tubes in the headers 10 and 11 need be removed only for replacing tubes, as it is not necessary to remove such fittings in cleaning the tubes by means of standard turbine tube cleaners, which are inserted from the top of the tubes by a man within the upper steam and water drums. This removes an objection often raised to the use of a number of such hand hole fittings.

In the designs shown it is possible to use straight or curved tubes, as desired, in either of the banks. In most cases it is desirable to use straight tubes in the inner banks as these tubes are the ones which accumulate the most scale, and by employing straight tubes they can be readily inspected to make certain that all of the scale is removed after a cleanser has been used. Again, with straight tubes in the inner banks there is no danger of sediment lodging near the lower ends as there is in the case of curved tubes. Where sediment lodges in a tube exposed to the radiant heat of the fire there is danger of blistering, and the use of the straight tubes, therefore, leads to an advantage in this respect. Tubes of different diameters may be used in the different banks. In Fig. 2 smaller tubes are shown in the outer banks than in the inner banks.

The banks of tubes in all of the designs above described are suspended over a common furnace 33 extending from the front to the rear of the boiler, the inner banks being so disposed as to converge toward each other upwardly, their upper ends meeting approximately in the transverse central vertical plane of the setting. There is thus provided a large A-shaped combustion chamber substantially closed at the apex and open to the gases at the upper part of the inclined sides, that is, at the uptake ends of the generating tubes of the inner banks. The gases divide and pass over the heating surfaces, as indicated by the arrows, and as previously described.

The furnace may be of any approved type with means for charging it preferably at the front and rear, so as to provide a substantially continuous fuel bed beneath the boiler. With such arrangement the character of the combustion may be maintained substantially constant from one side of the boiler to the other, and the loss often experienced through a stream or lane of excess air or unconsumed combustible gases passing through the boiler and escaping to the stacks will be avoided. It is well known among engineers that in ordinary boiler furnaces there is a great variation in analyses taken from different points in the path of the flow of gases leaving the furnace, whereas with the present furnace arrangement this action is reduced to a minimum, as any irregularity from the front to the rear of the grates disappears before the gases pass from the upper part of the combustion chamber, and as the composition of the gases for uniform firing conditions will be substantially uniform from one side of the boiler to the other it follows that the composition of the entire volume of the gases leaving the furnace will be substantially uniform.

The angle of inclination of the tubes of the heating surface is approximately 20° to the vertical, but I do not restrict myself to such degree of inclination, the essential feature being the disposition of the banks of tubes over a common furnace and combustion chamber to provide an A-shaped combustion chamber of relatively large volume, and the other features herein described, which contribute to an increased efficiency and economy in operation.

The steam and water drum into which the inner tubes are expanded has been referred to as being central. For certain space conditions and stoker constructions it might be advantageous to so locate this drum that it would not come exactly central with the furnace or boiler setting.

What I claim and desire to secure by Letters Patent of the United States is:—

1. In a water tube boiler, two inner banks of generating tubes inclined toward each other so as to form two sides of an A-shaped combustion chamber, a steam and water drum into which the upper ends of the tubes of both of said banks are expanded, two mud drums into which the lower ends of the tubes of the respective banks are expanded, two outer banks of tubes one on each side of the inner banks, steam and water drums and headers into which the tubes of the outer banks are expanded, steam and water circulators connecting the intermediate steam and water drum with the outer steam and water drums, and connections between the mud drums and said headers.

2. In a water tube boiler, two inner banks of generating tubes inclined toward each other so as to form two sides of an A-shaped combustion chamber, a steam and water drum into which the upper ends of the tubes of both of said banks are expanded, two mud drums into which the lower ends of the tubes of the respective banks are expanded, two outer banks of tubes one on each side of the inner banks, steam and water drums and headers into which the tubes of the outer banks are expanded, steam and water circulators connecting the intermediate steam and water drum with the outer steam and water drums, connections between the mud drums and said headers, and baffles to direct the hot gases to the upper portions of the inner banks of tubes, thence downward to the lower part of the outer banks, and thence upward over the tubes of the outer banks.

3. In a water tube boiler, two inner banks of generating tubes inclined toward each other so as to form two sides of an A-shaped combustion chamber a steam and water drum into which the upper ends of the tubes of both of said banks are expanded, two mud drums into which the lower ends of the tubes of the respective banks are expanded, two outer banks of tubes one on each side of the inner banks, steam and water drums and headers into which the tubes of the outer banks are expanded, steam and water circulators connecting the intermediate steam and water drum with the outer steam and water drums, connection between the mud drums and said headers, baffles to convey the hot gases to the upper portions of the middle banks of tubes, thence downward to the lower part of the outer banks and thence upward over and across the tubes of the outer banks, and walls forming dust pockets below the connections between the mud drums and lower headers for collecting any dust which falls between said connections.

4. In a water tube boiler, two inner banks of generating tubes inclined toward each other so as to form two sides of an A-shaped combustion chamber, a steam and water drum into which the upper ends of the tubes of both of said banks are expanded, two mud drums into which the lower ends of the tubes of the respective banks are expanded, two outer banks of tubes one on each side of the inner banks, steam and water drums and headers into which the tubes of the outer banks are expanded, steam and water circulators connecting the intermediate steam and water drum with the outer steam and water drums, connections between the mud drums and said headers, superheaters in the spaces between the banks of tubes, and pipes connecting the outer steam and water drums with said superheaters.

5. In a water tube boiler, two inner banks of generating tubes inclined toward each other so as to form two sides of an A-shaped combustion chamber, a steam and water drum and two mud drums into which the tubes of said banks are expanded, two outer banks of tubes one on each side of the inner banks, steam and water drums and headers into which the tubes of the outer banks are expanded, steam and water circulators connecting the intermediate steam and water drum with the outer steam and water drums, connections between the mud drums and said headers, said headers being located beyond the mud drums and having hand hole fittings through which the tubes of the outer banks may be removed and replaced.

6. In a water tube boiler, two inner banks of generating tubes inclined toward each other to form two sides of an A-shaped combustion chamber, steam and water and mud drums into which the tubes of said banks are expanded, two outer banks of tubes one on each side of the inner banks, steam and water drums and headers into which the tubes of the outer banks are expanded, connections between the mud drums and said headers, and a row of tubes expanded at their upper ends into the intermediate steam and water drum and at their lower ends into said headers.

7. In a water tube boiler, two inner banks of generating tubes inclined toward each other so as to form two sides of an A-shaped combustion chamber, a steam and water drum and two mud drums into which the tubes of said bank are expanded, two outer banks of tubes one on each side of the inner banks, steam and water drums and headers into which the tubes of the outer banks are expanded, steam and water circulators connecting the central steam and water drum with the outer steam and water drums, connections between the mud drums and said headers, baffles extending upwardly from the mud drums to direct the hot gases to the upper parts of the inner banks of tubes, baffles extending downwardly from the outer steam and water drums to direct the gases to the lower part of the outer banks of tubes, and a fuel chamber common to said banks of tubes.

8. In a water tube boiler, two inner banks of generating tubes inclined toward each other so as to form two sides of an A-shaped combustion chamber, a steam and water drum into which the upper ends of the tubes of said banks are expanded, two outer banks of tubes one on each side of the inner banks, steam and water drums into which the upper ends of the tubes of said outer banks are expanded, a furnace common to said banks of tubes, two mud drums one on each side of said furnace, headers connected to said drums, the lower ends of the outer banks of tubes being expanded into said headers, and the lower ends of a portion of the tubes of the inner banks expanded into the mud drums, and a portion expanded into said headers.

9. In a water tube boiler, two inner banks of generating tubes inclined toward each other so as to form two sides of an A-shaped combustion chamber, a steam and water drum into which the upper ends of the tubes of both of said banks are expanded, two mud drums into which the lower ends of the tubes of the respective bands are expanded, two outer banks of tubes one on each side of the inner banks, steam and water drums and headers into which the tubes of the outer banks are expanded, connections between the mud drums and said headers, and a fuel chamber common to said banks of tubes.

10. In a water tube boiler, two inner banks of generating tubes inclined toward each other so as to form two sides of an A-shaped combustion chamber, a steam and water drum into which the upper ends of the tubes of both of said banks are expanded, two mud drums into which the lower ends of the tubes of the respective banks are expanded, two outer banks of tubes one on each side of the inner banks, steam and water drums and headers into which the tubes of the outer banks are expanded, connections between the mud drums and said headers, baffles to direct the hot gases to the upper portions of the inner banks of tubes, thence downward to the lower part of the outer banks, and thence upward over the tubes of the outer banks, and a fuel chamber common to said banks of tubes.

In testimony whereof I have hereunto signed my name in the presence of two subscribing witnesses.

DAVID S. JACOBUS.

Witnesses:
E. P. TERRY,
EDITH CAMP.